April 17, 1951        H. J. OSTERHOF        2,549,123
APPARATUS FOR PACKAGING ARTICLES
Filed April 3, 1948        2 Sheets-Sheet 1
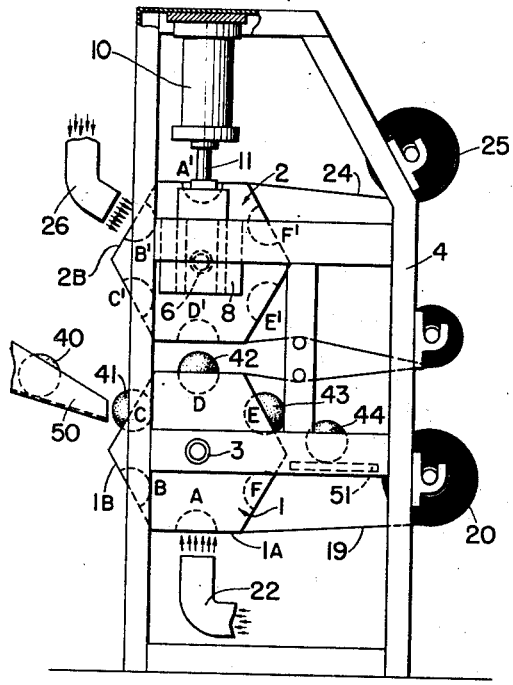
INVENTOR.
HAROLD J. OSTERHOF
BY
ATTORNEY April 17, 1951  H. J. OSTERHOF  2,549,123
APPARATUS FOR PACKAGING ARTICLES
Filed April 3, 1948  2 Sheets-Sheet 2
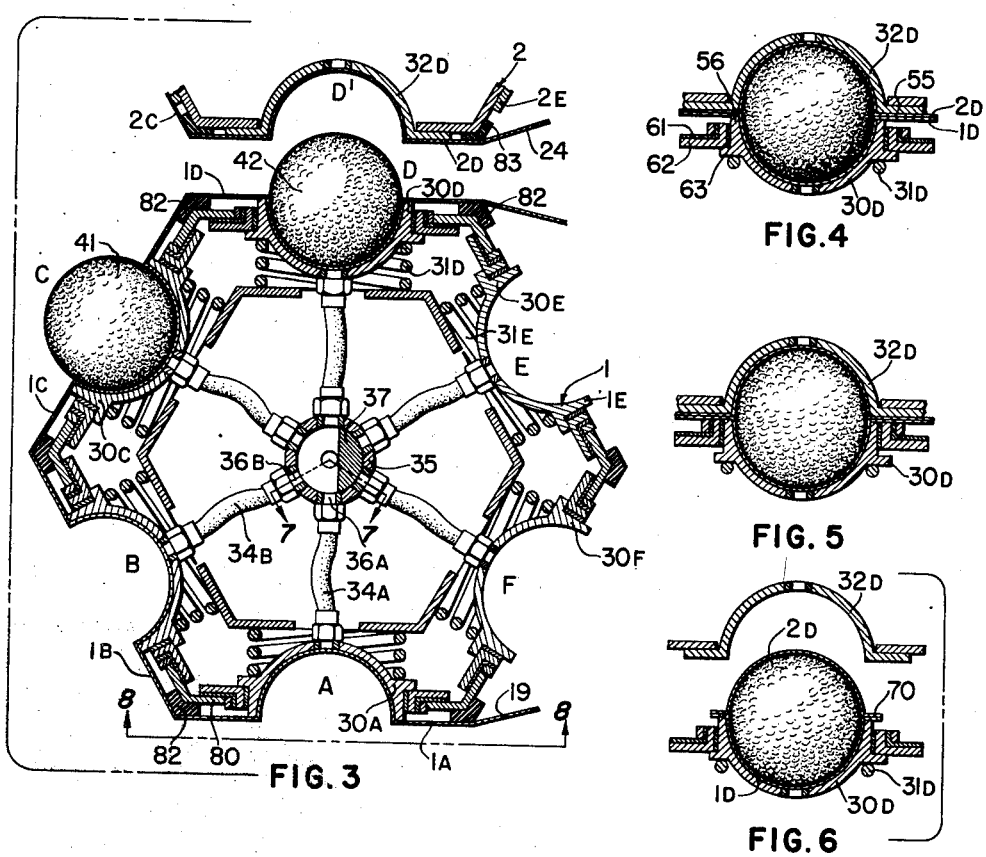
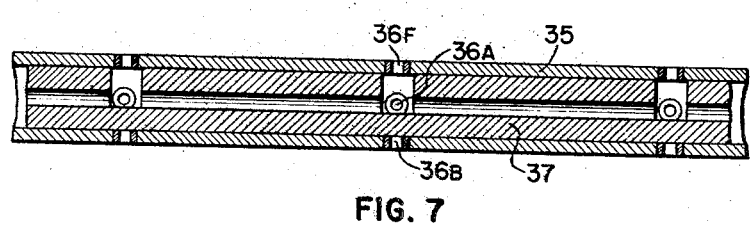
INVENTOR.
HAROLD J. OSTERHOF
BY
ATTORNEY Patented Apr. 17, 1951

2,549,123

UNITED STATES PATENT OFFICE 2,549,123

APPARATUS FOR PACKAGING ARTICLES

Harold Judson Osterhof, Akron, Ohio, assignor to Wingfoot Corporation, Akron, Ohio, a corporation of Delaware Application April 3, 1948, Serial No. 18,832

5 Claims. (Cl. 18—56)

This invention relates to an apparatus for packaging articles in stretched film.

The film employed is a stretched thermoshrinkable film; i. e., a stretched film which shrinks when heated. The film is preferably stretched in the two perpendicular directions so that, on heating, it shrinks in both directions. The stretching in both directions is advantageously conducted simultaneously and to the same extent, or the film may be stretched first in one direction and then in the other, each to such a degree that, on heating, the film shrinks more or less uniformly in both directions. Thus, if the object to be packaged be enclosed in a pocket of film larger than the object, the film may be shrunk more or less uniformly in all directions toward the object so that the wrapper forms a snug fit around it.

Because of the fact that the film shrinks when heated, it is impossible to use ordinary heat-sealing or heat-severing packaging machinery for packaging with this film. It is necessary that the film be held against shrinkage while heat is used to heat-seal plies of the film together, or to cut the film, in order to prevent shrinkage of the film before the sealing or cutting operation is completed.

According to this invention an article is packaged between two sheets of film, either one of which or both of which have been stretched and are, therefore, thermoshrinkable. Restricted areas of the films are held in such a way as to prevent shrinking when the film adjacent these areas is heated. By pressing two such heated areas together around the article to be packaged, the films are united, forming pockets containing the article, and by bringing a highly heated implement into contact with the film surrounding and joining the pockets, it is severed and separated from the balance of the film.

The films are stretched to receive the articles between them. Pockets may be sucked into the films by vacuum, or by the pressure of suitable forming mechanism against the films, or by pressing the films against opposite surfaces of the article, or in any desired manner. According to a preferred operation snubbers are applied to a restricted area of each of the two films to prevent stretching or shrinking thereof, a smaller area within each of these restricted areas is heated and stretched, an article is pocketed within the stretched portions of the film, and the films are then heat-sealed around the articles before the films are released from the action of the snubbers. Preferably, the pocketed articles are also cut from the surrounding portions of the films before the snubbers are released. On release of the snubbers or on cutting the pocketed articles from the films, whichever occurs first, the heated areas of the films shrink, drawing the films snugly to the article.

In a preferred adaptation of the invention the packaging operation is performed by bringing heated areas of the film opposite one another with the article to be packaged between them, pressing the films together around the article, and gripping them to prevent shrinkage, and then heating to seal the films together around the individual articles, and by means of a hot wire or other suitable heated instrument severing the portions of the films enclosing the article from the surrounding areas of film.

The packaging apparatus to which the invention more particularly relates includes two drums over which separate films of wrapping material are carried. The drums are equipped with means for rotating them at the same speed and stopping them intermittently. The drums are moved and then stopped simultaneously. The drums are flat sided, and the periods of movement and rest are coordinated with radial movement of one or both of the drums so that when the drums are motionless, opposing flat faces of the drums are brought together, pressing the two films between them. There is at least one cup or similar depression in each face, and the cups in the several faces mate with one another when the faces are brought together. The articles to be wrapped are fed to the packaging apparatus manually or automatically so that a single article is embraced by the cups as they are mated, with the films on opposite sides of the article and between the article and the cups. Thus, when the cups are brought together, they form pockets of the film around the individual articles.

There is a flat brim around the mouth of one of the cups in each mating pair and an outstanding rim around the mouth of the other. When the cups are pressed together, the films are gripped between these so as to prevent shrinkage of the film when it is heated during the heat-sealing and cut-off operation. The two films are then heated outside of the gripping means, either to seal the two films together or to both seal them together and cut them from the surrounding film. In the specific embodiment illustrated in the accompanying drawings, the cup with the outstanding rim is resiliently mounted and is depressed by pressure of the flat brim of the other cup against it. The outstanding rim is surrounded by a heating element—which includes both sealing means and a cut-off—and the resiliently mounted cup is depressed until the flat brim presses the films against this heated element. Thus, each time the movement of the drums stops and the drums are pressed together, the two films are gripped together around the edge of the mating cups, and then the areas of the films surrounding the gripping means are brought into contact with the heated element and thereby sealed together and severed from the surrounding areas of film.

By gripping the films firmly around each of the articles as heat is applied to the films, shrinking of the films in the areas enclosed by the gripping means is prevented. It is also desirable to limit the areas surrounding the articles being packaged, which are subjected to shrinking. Snubbers at the transverse edges of each drum face prevent longitudinal shrinkage. Several cups may be spaced laterally in each face, and if so, it will be desirable to provide snubbing means between each two to prevent lateral shrinkage.

The thermostretchable plastics differ in properties. In some, shrinking is effected through plastic flow of the material. The elastic flow, if any, is negligible. Such films are not thermoshrinkable after stretching. In other plastics, elastic flow predominates. This invention relates to the use of such films in stretched condition. They are referred to as stretched, thermostretchable films. They include, for example, films of rubber hydrochloride (sold under the trade name Pliofilm), vinyl chloride polymer and copolymers, vinylidene chloride copolymers, polyethylene, vinyl polymer-synthetic rubber mixtures, etc.

Rubber hydrochloride film appears unique in retaining the ability of being sealed, stretched, and shrunk for some period after heating, even though it be cooled in the intervening period. For this reason the use of rubber hydrochloride film will be preferred, and the apparatus shown in the drawings is designed particularly for use with this film. Apparatus designed for use with other films must be enclosed or otherwise provided with means for keeping the film hot until operated upon. Because rubber hydrochloride film retains its heat-shrinking ability, cups may be stretched into it which, on mating, form pockets larger than necessary to enclose the several articles to be packaged because after packaging, each pocket, even after cooling, will shrink until it tightly embraces the article it contains.

The invention will be further described in connection with the accompanying drawings which show suitable packaging equipment, more or less diagrammatically, designed particularly for use with rubber hydrochloride film. In the drawings:

Fig. 1 is a side elevation of the packaging apparatus, omitting the driving mechanism;

Fig. 2 is a similar view which shows the driving mechanism but omits the supporting frame and other details shown in Fig. 1;

Fig. 3 is an enlarged sectional view of the lower drum of the packaging apparatus and a portion only of the upper drum;

Figs. 4, 5 and 6 show a single cup of the packaging apparatus with its sealing means and cut-off at different stages of the packaging cycle;

Fig. 7 is a section on the line 7—7 of Fig. 3;

Fig. 8 is a plan view on the line 8—8 of Fig. 3; and

Figs. 9 and 10 show alternative heat-sealing and cut-off means.

The packaging unit comprises the drums 1 and 2 which are each six-sided but may be designed with a larger or smaller number of sides. They needn't both have the same number of sides. The drum 1 is rotatably supported by the hollow trunnion 3 in the supporting frame 4. The drum 2 is rotatably supported in blocks 8 at each end of the drum. The hollow trunnion 6 serves for supporting one end of the drum. The blocks 8 are slidably supported on the frame 4. Air cylinders 10 located at opposite ends of the drum are provided with plungers 11 which reciprocate in and out of the air cylinder and are fastened to the blocks 8 or extensions thereof. At each pause in the rotation of the drums the air cylinders press the drum 2 against the drum 1, and then return it to the position shown in Fig. 1.

As shown in Fig. 2, the drums 1 and 2 are connected to driving mechanism which comprises gears 13 and 14 which are of the same size. The lower gear is mounted on the plate 15 which is provided with equally spaced studs 16 which are equal in number to the sides of the drums. The cam 17 revolved at uniform speed by the motor 18 contacts the studs 16 in rotation, and thus moves the drums intermittently. Thus, the drum 1 comes to rest at the stations A, B, C, D, E and F. The drum 2 comes to rest at the corresponding stations A', B', C', D', E' and F'. For clarity, the faces of the drums at these various stations and the portions of the wrapping films which cover these respective faces are designated 1a, 1b, 1c, etc., and 2a, 2b, 2c, etc. Thus, in Fig. 1 the stretched rubber hydrochloride film 19 from the roll 20, as it passes over the drum, lies first on the face 1a which is heated by the hot air blast from the pipe 22. The stretched rubber hydrochloride film 24 from the upper roll 25 first contacts the face of the drum 2 which I designate as 2a. The film 24 is subjected to no treatment at station A'.

Both drums then move to the stations B and B'. The portion of film 19 which formerly covered the side of the drum designated 1a is now the film which covers the side of the drum designated 1b. The portion of film 24 which covered side 2a of drum 2 is now covering the side 2b of this drum. Here it is subjected to the hot air blast from the pipe 26.

Now turning to Fig. 3, we see a detailed section of the drum 1 and part of the drum 2. In each face of the drum 1 there is a cup 30 resiliently supported by a spring 31, and these several cups and springs are designated herein 30a, 30b, 30c, etc., and 31a, 31b, 31c, etc. The only cup of the drum 2 which is shown in Fig. 3 is designated 32d. Each of the cups of the drum 1 is connected by a hose 34a, 34b, etc., to the hollow axis of the drum 35 through ports 36a, 36b, etc. The axis is connected through hollow trunnion 3 with a vacuum pump. The stationary plate 37 inside the hollow axle 35 closes and opens the ports in rotation. Thus, the film 19 on leaving the roll 20 first covers the cup 30a. This cup is placed under vacuum as it reaches the position 30a through opening of the port 36a. The portion of the film covering the cup is simultaneously heated by the blast of hot air from the pipe 22a. Thus, as the film is rendered stretchable by the heat, it is drawn into the cup so that at station A this cup becomes lined with the film.

The drum is then moved to the next station. No work is done on the film 19 at this station, but the vacuum continues to suck the film tight against the walls of the cup. The drum now moves to the next station C. Here an orange is placed in the film-lined cup.

Various oranges 40, 41, 42, 43 and 44 are shown in Fig. 1. They are fed to the machine down the trough 50. They are spaced manually or by automatic means so that single oranges are delivered to the drum 1 one by one as the several film-lined cups are brought into position to receive them. Thus, the orange 40 will eventually be delivered to the film-lined cup 30b. Oranges 41 and 42 are held in the cups 30c and 30d at stations C and D. The orange 43 has been wrapped and cut out of the currounding film and is ready to follow the wrapped orange 44 (Fig. 1) which has been delivered to the inclined chute 51 for packaging in a crate or other suitable receptacle.

Let us follow orange 42 for a moment: It is delivered down the chute to a film-lined cup at station C. The drum then rotates and brings the orange to the station D. Here the cup is designated 30d, and the portion of the film 19 which lines this cup is designated 1d. The cup is located in the face 1d of the drum. When at this station, the top half of the orange is covered with the portion 2d of the film 24 which lines the cup 32d in the side 2d of the upper drum 2.

Following the sequence of steps to which the film is subjected as it rotates with the upper drum 2, we have previously observed that no action is taken on the film at the station A'. At the station B' the film is heated with hot air from the pipe 26. As the drum rotates, the film is sucked into the cup 32 by means similar to that provided on the drum. Thus, at the station B' as the film is heated with the blast from the pipe 26, the port leading to the cup is opened so that as the film becomes stretchable, it is sucked into the cup. No operation is conducted at the station C'. When the film-lined cup reaches the station D', the whole drum is moved by the air cylinders 19 into pressure contact with the lower drum.

The application of heat to the film is perhaps best discussed in connection with Figs. 4, 5 and 6. Here the two cups 30d and 32d are brought together with the films 1d and 2d between them. The flattened brim 55 of the upper cup 32d is pressed against the outstanding flange 56 on the cup 30d so that the films are firmly gripped at the circumference of the orange to prevent shrinkage of the areas of the films which are in contact with the orange. As the pressure continues, the spring 31d which supports the cup 30d is compressed, and the cup is pushed down vertically within the annular ring which surrounds it.

This ring comprises the electrically heated metal ring 61. Adjacent this ring is the ring 62 which is formed of a composition of low heat conductivity. This may, for example, be the mineral composition Transite (manufactured by the Johns-Manville Corporation), poly-tetrafluorethylene (known as Teflon and manufactured by E. I. du Pont de Nemours and Company) or Silastic rubber (a product of the Dow-Corning Corporation). Such material of low heat conductivity is heated to a relatively low temperature by contact with the highly heated metallic ring 61. The ring 61 is heated to a temperature which quickly melts the films and thus cuts out of the surrounding areas the portions of the film which package the orange. The heated ring 62 of lower temperature, when pressed against the films, seals them together. The ring 63 is of asbestos or other insulating material and prevents the cup 30d from becoming heated. Thus, when the upper drum 2 presses against the lower drum 1, the cups 32d and 30d grasp the film between them so that when the heated annular element approaches this film, which is a stretched film, the areas which are to enclose the orange are not affected. After the fil mis thus grasped tightly around the circumference of the orange, the cup 30d is pushed down inside the heated element. Pressure against this heated annular element causes the highly heated ring 61 to immediately cut the film encircling the orange from the surrounding film, and the pressure of the films against ring 62 seals them together at the circumference of the cut-out portions. Fig. 5 shows how the cup 32d presses the cup 30d down within the heating element until the film contacts the heating element.

After the severance of the films and their union has been completed, the two drums separate. This separation of the drums is illustrated in Fig. 6. Here the cup 32d is spaced from the cup 30d. The spring 31d has returned the cup to its former relation with the heated element and separated the film from this element. The two film portions 1d and 2d surround the two halves of the orange and are united at their circumferences in the two-ply annular seal 70. Just as soon as the two cups separate, the heated pocket of film which surrounds the orange shrinks so that in Fig. 6 we see the enclosing film shrunk to the orange and tightly surrounding it. The unsealed portion of the film formerly held between the flanges 55 and 56, now contacts the orange. Even though the orange were somewhat smaller than the cups, the film enclosure would shrink to it after the cups are separated and the vacuum is broken. The vacuum connection to the cup 32d must be broken before the cups are separated. To accomplish this, the port which connects the vacuum hose from the cup 32d with the evacuated axis of the drum 2 is closed before the cup reaches station D'.

Fig. 8 is a plan view on the line 8—8 of Fig. 3, looking upward against the face 1a of the lower drum just after it has been covered with film and the film has been sucked down into the cup. The film 1a is broken away at the center to expose the cutting ring 61, the sealing ring 62, and the ring of insulation 63. The element 61 is connected with terminals to the leads 75 and 76 by the bolts 77 in the usual fashion.

This Fig. 8 shows how the heating unit is supported by the longitudinal channels 80 and crossbars 81. Snubbers 82 of rubber or rubber-like material positioned longitudinally of the drum hold the film as it is sucked down into the cups. There is no movement of the film longitudinally over these snubbers. Fig. 3 shows corresponding snubbers 83 on the drum 2 to prevent longitudinal movement of the upper film as it is sucked down into the cups.

When the drums are brought together, the film is grasped between these snubbers, and as the spring 31d is compressed, the snubbers 82 which support the stretch of film 1d are correspondingly compressed. To prevent such compression of the snubbers from moving the portions of the films 1c and 2c, the sides of the drum 2 may be made of somewhat smaller transverse area than the sides of the drum 1 so that the snubbers 82 and 83 do not press against one another, or the pressure of 83 against the snubber 82 may be limited to the edge of the snubber 82 nearest the orange and thus prevent distortion of any portion of the snubber 82 holding the stretch of film 1c.

As illustrated in Fig. 7, the drum may be of indefinite length so that any given number of oranges or other articles may be packaged simultaneously. The articles packaged need not be spherical. They may be of any shape, and the film heated by the cut-off will contract to fit snugly around them.

To summarize the operation, the two films are fed over the respective drums, and cups are sucked into them. Oranges or other articles are fed into the cups in one of the films and are then enclosed by bringing the cups of the two films together. The films are sealed together around the articles, and the packaged articles are cut out of the surrounding films by heated means while the portions of the films covering the articles are prevented from shrinking.

Fig. 9 shows an alternative cut-off arrangement in which the highly heated cut-off ring 90 is raised above the heat-sealing plate 91 to insure complete severance of the films. The current through the cut-off may be turned on and off by suitable means, as desired. In Fig. 10 the flat cut-off element 95 is raised above the heat-sealing surface 96. The rim 97 of the upper cup tapers slightly downward so that this rim is several ten thousandths of an inch closer to the outer edge of the cut-off ring 95 than to the inner edge of the heat-sealing ring 96.

Thus, modifications may be made in the apparatus more specifically disclosed. The invention is defined in the appended claims and is not limited by the more specific disclosure.

What I claim is:

1. A packaging device which comprises two drums, each with a plurality of substantially flat sides, mating depressions in the respective sides of the two drums, the drums being connected with rotating means, means for pressing flat sides of the respective drums together and separating them, with snubbers at the transverse edges of the sides adapted to meet and separate as the sides are brought together and separated, and means for supplying two sheets of wrapping material and covering a plurality of the faces of each drum with the respective sheets.

2. A packaging device which comprises two drums with parallel axes, each having a plurality of flat faces, means for holding two rolls of wraping film, means for heating the film, and means for feeding film from the respective rolls over the respective drums, mating depressions in the respective faces of the drums, and means for rotating the drums and moving the drums toward and away from each other and thus from time to time bringing the edges of the respective depressions into mating relationship and then separating them.

3. A packaging device which comprises two drums with parallel axes, each having a plurality of flat faces, means for holding two rolls of wrapping film and for feeding film from the respective rolls over the respective drums, means for heating the film, mating depressions in the respective faces of the drums, each of the depressions being connected through a valve with vacuum means, and means for rotating the drums and moving the drums toward and away from each other and thus from time to time bringing the edges of the respective depressions into mating relationship and then separating them.

4. A packaging device which comprises two drums with parallel axes, each with the same number of flat sides, two supports for supplying films over the drums, means for heating each film, means for intermittently moving the drums substantially simultaneously in opposite directions and stopping the drums with flat sides of the respective drums opposed to one another, mating depressions in each such pair of flat sides, means for bringing the drums together with the depressions in mating relationship, at least one of the depressions of each pair being a cup which is resiliently supported, an outstanding flange surrounding each depression on one flat surface adapted to contact means on the opposing flat surface whereby films between the flat sides will be held against movement when the depressions are in mating relationship, and heating means surrounding the resiliently supported cup whereby when the cup is depressed when in contact with film, the film is brought into contact with the heating means.

5. A packaging device which comprises two drums with parallel axes, each with the same number of flat sides, two supports for supplying films over the drums, means for heating each film, means for intermittently moving the drums substantially simultaneously in opposite directions and stopping the drums with flat sides of the respective drums opposed to one another, mating depressions in each such pair of flat sides, means for bringing the drums together with the depressions in mating relationship, at least one of the depressions of each pair being a cup which is resiliently supported, an outstanding flange surrounding one resiliently supported depression of each pair which is adapted to contact means on the opposing flat surface whereby films between the flat sides will be held against movement when the depressions are in mating relationship, vacuum means in valved connection with each depression, operating means connected with the respective valves whereby film over each of the respective flat sides is sucked into the depression therein prior to bringing the depressions into mating contact, and heating means surrounding the resiliently supported cup whereby when the cup is depressed when in contact with film, the film is brought into contact with the heating means.

HAROLD JUDSON OSTERHOF.

REFERENCES CITED

The following references are of record in the file of this patent:

UNITED STATES PATENTS

| Number | Name | Date |
|---|---|---|
| 1,049,908 | Pannier, Jr. | Jan. 7, 1913 |
| 1,386,540 | Sullivan | Aug. 2, 1921 |
| 1,402,293 | Heist | Jan. 3, 1922 |
| 1,482,707 | Skinner | Feb. 5, 1924 |
| 2,141,318 | Salfisberg | Dec. 27, 1938 |
| 2,152,101 | Scherer | Mar. 28, 1939 |
| 2,210,509 | Strauch | Aug. 6, 1940 |
| 2,230,189 | Ferngren | Jan. 28, 1941 |
| 2,232,783 | Hausheer | Feb. 25, 1941 |
| 2,248,580 | Morin et al. | July 8, 1941 |
| 2,260,667 | Hoof | Oct. 28, 1941 |
| 2,374,504 | Salfisberg | Apr. 24, 1945 |
| 2,403,482 | Cloud | July 9, 1946 |
| 2,420,983 | Salfisberg | May 20, 1947 |
| 2,486,759 | Pfeiffer | Nov. 1, 1949 |
| 2,490,781 | Cloud | Dec. 13, 1949 |